USX005499709A

United States Patent [19]
Easton

[11] Patent Number: 5,499,709
[45] Date of Patent: Mar. 19, 1996

[54] CONVEYOR WITH SEPARATOR/ALIGNER

[75] Inventor: Richard L. Easton, St. Peters, Mo.

[73] Assignee: Alvey, Inc., St. Louis, Mo.

[21] Appl. No.: 228,033

[22] Filed: Apr. 15, 1994

[51] Int. Cl.⁶ ..................................................... B65G 13/02
[52] U.S. Cl. ........................................... 198/786; 198/782
[58] Field of Search ................................... 198/372, 782, 198/785, 786, 787, 411, 456

[56] References Cited

U.S. PATENT DOCUMENTS

| 3,642,113 | 2/1972 | Burgis | 198/372 |
|---|---|---|---|
| 3,905,472 | 9/1975 | Schuster | 198/786 X |
| 5,240,101 | 8/1993 | LeMay et al. | 198/786 X |

FOREIGN PATENT DOCUMENTS

1505858  9/1989  U.S.S.R. ................... 198/782

Primary Examiner—Cheryl L. Gastineau
Attorney, Agent, or Firm—Varnum, Riddering, Schmidt & Howlett

[57] ABSTRACT

A roller conveyor for aligning and separating material placed on the conveyor comprises a frame having side walls connected by crossmembers and a plurality of rollers mounted between the side walls. The frame further comprises a pair of supplemental side walls disposed between the parallel side walls to define an opening in which is disposed an aligner/separator assembly. The aligner/separator assembly comprises two frame mounted counter-rotating rollers driven by a motor. The counter-rotating rollers extend at a predetermined angle above the plane of the conveyor. The counter-rotating rollers rotate in the direction of the corresponding side wall and any unit contacting one of the rollers is laterally translated in the direction of the corresponding side wall. The counter-rotating rollers serve to separate adjacent units and to align the units with respect to the counter-rotating rollers.

21 Claims, 7 Drawing Sheets

CONVEYOR WITH SEPARATOR/ALIGNER

FIELD OF THE INVENTION

This invention relates to material handling systems and more specifically to apparatus for aligning and separating material on a conveyor.

DESCRIPTION OF RELATED ART

Material handling systems are commonly used in warehouses and the like where it is desireable to move individual units, such as packages, containers, etc. and pallets loaded with such units, between locations with minimum use of human resources. One application for a conveyor system is in the unloading of loaded pallets from a delivery vehicle backed into a loading dock. Pallets are commonly loaded on the vehicle in a side-by-side relationship. A fully loaded semi-trailer, for example, may have two rows of pallets with a number of pallets in each row. The truck may be equipped with a power driven conveyor arrangement to move the pallets, typically side-by-side, out of the truck onto a loading dock conveyor. Alternatively, the pallets may be drawn from the vehicle by means of a cable attached to the most forward positioned pair of pallets, to draw the pallets side-by-side from the vehicle onto the dock conveyor. The pallets are typically conveyed onto an accumulation conveyor and picked up by forklift trucks or by robotically controlled equipment. The pallets may be moved to a storage location such as a high rise storage area with a number of precisely dimensioned storage units. Precise positioning and alignment of the unloaded pallets is usually a requirement for robotic handling of pallets.

Due to movement during shipping, or other factors, adjacent side-by-side pallets may be forced tightly against each other on the truck and may have become attached to each other. The pallets may also be in various skewed orientations with respect to the sides of the vehicle. Before side-by-side pallets can be handled by a forklift, they must be separated by a predefined distance. If the pallets have become attached to each other, a breaking force may have to be applied.

In one prior art roller conveyor arrangement, pallets are aligned by the use of skewed rollers, extending at an angle to the path of the flow of the units, forcing the units toward one side of the conveyor. The units are then straightened by means of side collars on the rollers along a side wall of the conveyor. A disadvantage of this arrangement is that a significant distance, typically several times the length of a pallet, of skewed rollers is required to move the pallets toward one side. Another disadvantage of that arrangement is that all pallets are forced against one side of the conveyor, even if they are properly oriented. Furthermore, this system has relatively high wear due to the heavy pallets being continually forced toward one side, resulting in the conveyor system requiring substantial maintenance. In the prior art systems, side-by-side pallets may be separated by means of two oppositely oriented skewed-roller conveyor segments forcing pallets to opposite side walls. This separator arrangement has all the disadvantages of the skewed-roller aligner.

SUMMARY OF THE INVENTION

These and other problems of the prior art are overcome in accordance with this invention by an aligning roller positioned such that its longitudinal axis is disposed at an angle to the plane of a conveyor and one end of the aligning roller extends above the conveyor plane. The roller may be positioned adjacent one side of the conveyor and the one end of the roller extending above the plane of the conveyor is positioned downstream from the entry end of the conveyor. Any portion of a unit moved on the conveyor and contacting the aligning roller is translated laterally away from the aligning roller, thereby aligning the unit in a predetermined orientation with respect to the aligning roller. The aligning roller is preferably rotated by a drive motor.

In accordance with another aspect of the invention, a pair of counter-rotating aligner rollers are disposed in a side-by-side relationship, each adjacent to one of two separate conveyors or conveyor sections arranged in substantially the same plane, to serve as a separating unit. Advantageously, units being conveyed in the direction of the aligning rollers in a side-by-side relationship and coming into contact with the pair of rollers are separated from one another. Furthermore, each unit is aligned with respect to a line parallel to the longitudinal axis of the aligning rollers. In this manner, two units, such as pallets, positioned in a side-by-side relationship are separated by a predefined distance at least as great as the width of the two adjacent rollers and both are aligned on separate conveyors or conveyor sections.

In one embodiment of the invention, the aligning rollers are disposed on a frame supported on adjustable legs within an opening in the plane of the conveyor. The adjustable legs allow the ends of the aligner frame to be independently adjusted to change the angle of the rollers relative to the plane of the conveyor. In another embodiment, the aligner frame has a lower end pivotally supported on the conveyor frame and an upper end adjustably supported on the conveyor frame to allow for adjustment of the angle of the rollers with respect to the plane of the conveyor frame.

It is an advantage of the aligner roller of this invention that a unit moved on a conveyor is aligned in a direction defined by the axis of the aligning roller without being forced against one side of the conveyor. It is a further advantage of this invention that units contacting the aligning roller are aligned and positioned a predefined distance, determined by the radius of the roller, from the longitudinal axis of the roller. Consequently, the unit is positioned in the proper orientation and at a predefined location relative to the conveyor to allow the unit to be picked up by an automated device at a precisely defined location.

Advantageously, a pair of counter-rotating rollers, mounted at an angle to a conveyor plane may be mounted on opposite outer sides of a conveyor to move units on the conveyor toward each other. In that arrangements, pallets or other units which are to be loaded in a side-by-side arrangement are aligned and moved toward each other and may be kept separated from each other by a predefined distance defined by the widths of the units and the distance between the rollers. Furthermore, an aligning roller in accordance with this invention may be positioned at a center area of a conveyor and used as a selection device causing units moving toward the roller to be laterally translated in one direction or the other, depending upon the direction of rotation of the roller.

BRIEF DESCRIPTION OF THE DRAWING

The invention will now be described with reference to the drawing wherein.

DETAILED DESCRIPTION

Figure 1:
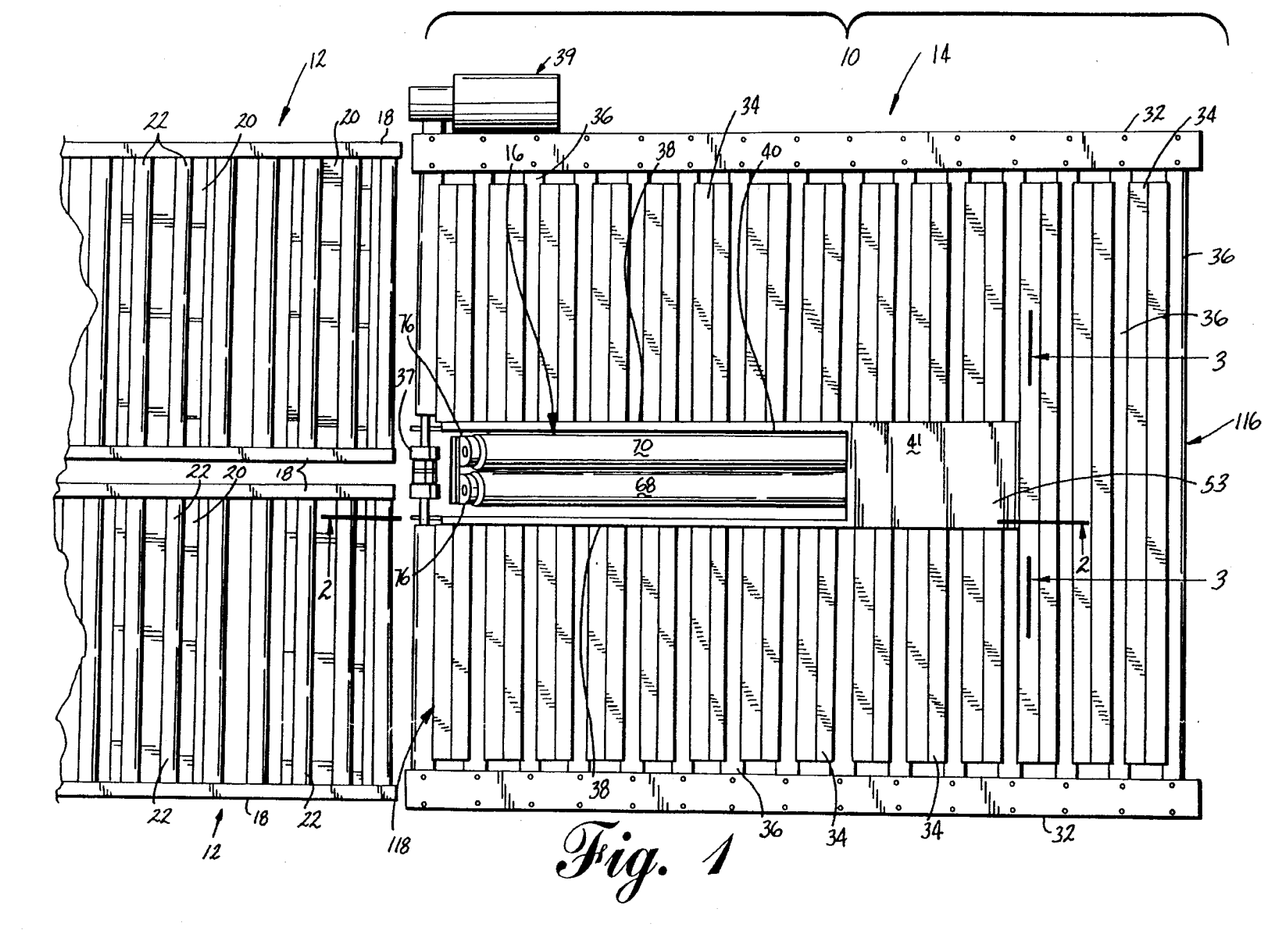
FIG. 1 is a plan view of a roller conveyor incorporating the principles of the invention.

FIG. 1 shows a conveyor assembly 10 having an entry end 116 and an exit end 118, aligned with a pair of conventional roller conveyors 12. The conveyor assembly 10 comprises a roller conveyor 14 and an aligner/separator 16 disposed within an opening 40 of the plane of the roller conveyor 14. Although the conveyor assembly 10 is shown as a unitary roller conveyor structure aligned with two roller conveyors 12, other conveyor arrangements and another conveyor medium, such as a conveyor belt or chain may be used. The roller conveyor 14 comprises parallel outer side walls 32 and secondary side walls 38, which define the opening 40 in which the aligner/separator 16 is disposed. A plurality of conveyor rollers 36, having parallel longitudinal axes are rotatably mounted between outer side walls 32 near the entry end 116 and between one of the outer walls 32 and one of the secondary walls 38 in the area adjacent the opening 40. The aligner/separator 16 is disposed at an acute angle relative to the plane of the conveyor, defined as a plane tangent to the upper surface of the rollers 36.

The roller assembly 16 has two counter-rotating rollers 68, 70 supported at one end in bearings 76. The other ends of the rollers are disposed below the plane of the conveyor 14, under a removable cover 41 which partially covers the opening 40. The conveyor rollers 36 are driven in a conventional manner by means of a motor 39 and power is coupled from one side of the conveyor 14 to the other by means of a drive coupling 37. A plurality of walk plates 34 are disposed between the rollers 36 to facilitate access to the aligner/separator. The portion of the conveyor 14 at the entry end 116 is shown in FIG. 1 as extending between the opposing side walls 32. In another embodiment of the invention, the rollers in that area may be divided so as to provide a relatively narrow opening (not shown) in the central portion of conveyor to accommodate a cable which may be used to draw loaded pallets from a vehicle and onto the conveyor 14.

In one particular implementation of the invention, the highest part of the rollers 68, 70 extend approximately 2 ½" above the conveyor plane and each roller has a diameter of approximately 4". While the aligning rollers 68, 70 may be used, and will function in certain cases, without being driven, the aligning rollers are preferably driven at a speed somewhat faster than the speed of the conveyor 14. In one specific application, the speed of the conveyor 14 is approximately 30 feet per minute and the surface speed of the rollers 68, 70 is 5 feet per minute faster, i.e. 35 feet per minute.

The conveyors 12, shown in FIG. 1, are conventional roller conveyors having a plurality of rollers 22 rotatably engaging opposed side walls 18. The side walls 18 are supported by legs 24, shown in the sectional view of FIG. 2, in a conventional manner. The side walls 18 are interconnected by cross members 20. Preferably, the side walls, cross members and legs are made from a channel steel having a C-shaped cross section defined by a central web 26 from which extends opposing side flanges 28 and 30. The legs 24 are provided with adjustable feet 25 preferably made from L-shaped steel plate. Each foot has a horizontal slot 27 and an angled slot 29, which are complementary to an angled slot 31 and a horizontal slot 33, respectively, disposed on the web 26 of the legs 24. Fasteners 35, such as a nut and bolt, adjustably mount the feet 25 to the legs 24 by passing through the aligned horizontal slot 27 and angled slot 31 and the horizontal slot 33 and angled slot 29. In this manner, the level of the roller conveyor 12 can be adjusted by adjustment of the feet 25 with respect to the legs 24.

Figures 2, 3:
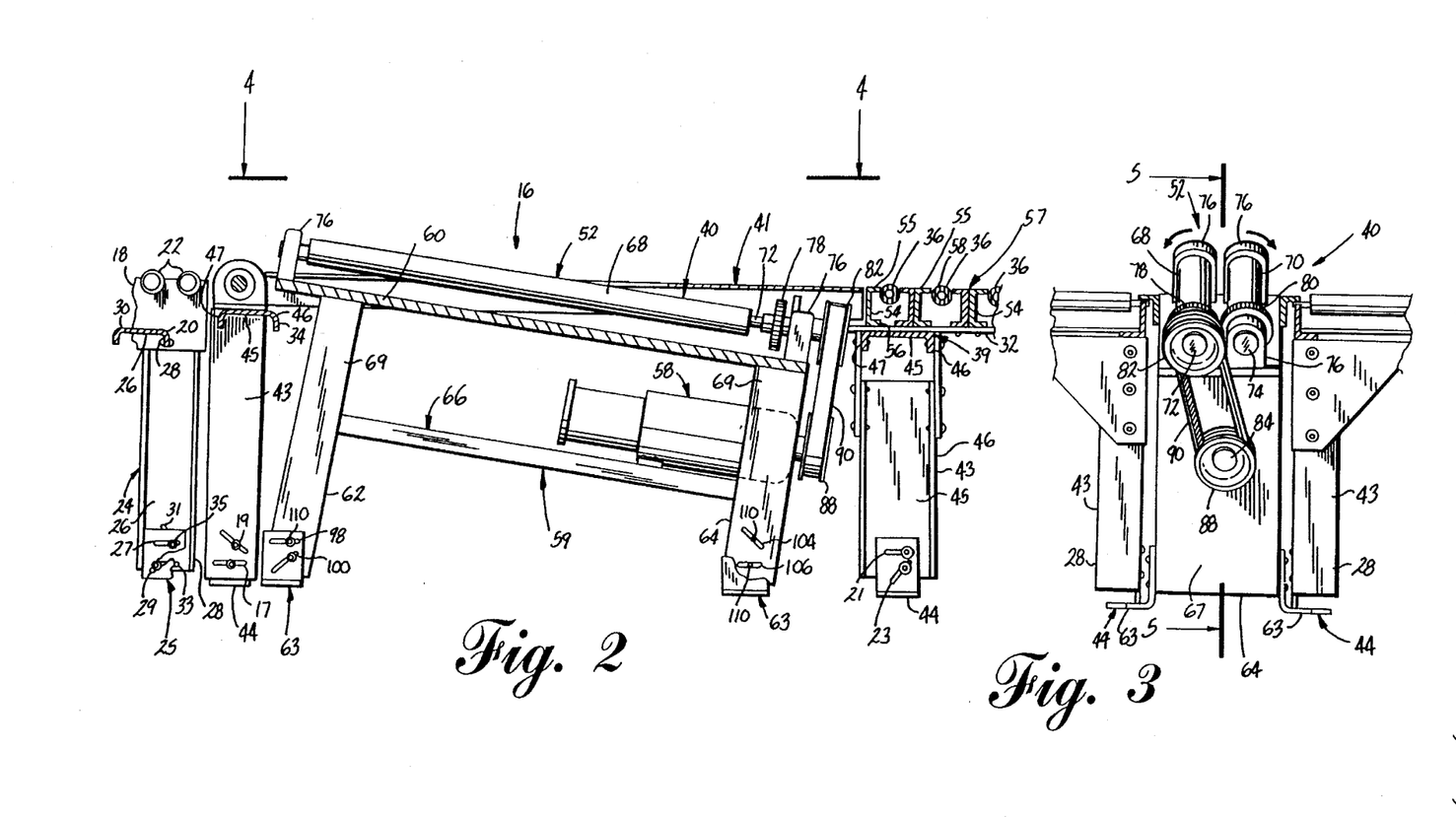
FIG. 2 is a sectional view along lines 2—2 of FIG. 1.
FIG. 3 is a sectional view along lines 3—3 of FIG. 1.

Referring to FIGS. 2 and 3, the conveyor 14 is shown supported by legs 43 with feet 44 substantially identical to the feet 25 described above. The outer side walls 32 and secondary side walls 38 are interconnected by means of cross members 39. The cross members 39 and the legs 43 are preferably made from a channel steel and have a web 45 and flanges 46 and 47. The feet 44 as provided with divergent slots 21, 23 and the web 45 of the legs 43 are each provided with divergent slots 17, 19, to provide for convenient adjustment of the legs 43 with respect to the feet 44. The outer walls 32 are preferably made from C-channel shaped steel and the secondary walls 38 are preferably made from L-shaped steel. The rollers 36 and the walk plates 34 are mounted to the side walls 32 and 38. The outer side walls 32 and secondary side walls 38 are mounted to the cross members 39.

The walk plates 34 preferably made from channel steel having a central web 54 from which extends a pair of opposed first and second flanges 55, 56. The flanges 56 are mounted to the outer and secondary side walls 32, 38 so that the flanges 55 form a surface 57 for the walk plates 34. The walk plates may be rigidly attached to the side walls or may be inserted in a slotted portion (not shown in the drawing) of the side walls for ease of assembly and field maintainability. An opening 58 is formed between adjacent pairs of walk plates 34 and the rollers 36 are disposed therein. A portion of each roller 36 extends through the opening 58 and above the surface 57 such that the walk plates 34 do not interfere with the movement of goods on the conveyor 14.

Further with reference to FIGS. 2 and 3, the aligner/separator 16 is disposed within the opening 40 of the conveyor 14 and is partially covered by the cover 41. The aligner/separator 16 comprises a roller assembly 52 and an electric motor 58, both mounted to a frame 59. The frame 59 comprises a roller platform 60 and a drive means platform 66 supported by legs 62 and 64. The legs 62 and 64 are substantially similar to the legs 24 and 43, as described above, and are preferably made from channel-shaped steel having a web 67 and opposed flanges 69. The legs 62 and 64 each have a horizontal slot 106 and a slot 104 extending at an angle to the horizontal. The leg 62 and 64 each mount a foot 63 which is substantially similar to the feet 25 and 44 and each is provided with a horizontal slot 98 and a divergent angled slot 100. The slots 98, 100 are used in combination with fasteners 110 and slots 104, 106 to adjustably connect the feet 63 to the legs 62 and 64. This arrangement allows the opposite ends of the frame 59 to be raised and lowered independently.

One of the legs 62, 64 is longer than the other leg so that the counter-rotating roller assembly 52 will be disposed at an acute angle with respect to a conveyor plane tangent to the upper surface of the rollers 36. The angle of the rotating roller assembly 52 with respect to the conveyor plane may readily be adjusted by adjustment of the feet 63 with respect to the legs 62 and 64. The angle of the roller assembly 52 with respect to the conveyor plane may be adjusted to any desired angle, but is typically set between 2° and 10° and preferably at 3.5°. The preferred angle will vary depending on the weight of the pallet and load geometry.

Figure 4:
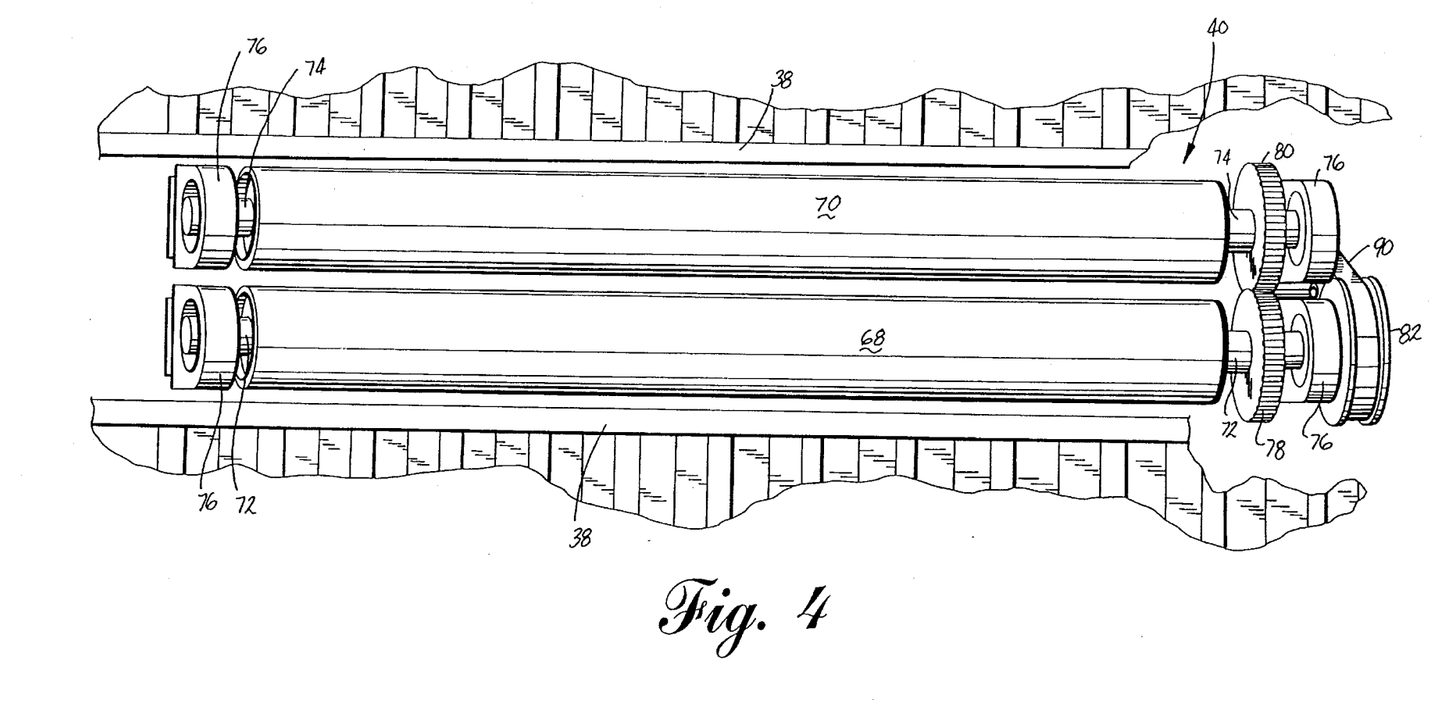
FIG. 4 is a partial enlarged plan view seen along lines 4—4 of FIG. 2.

Referring to FIGS. 1 through 5 generally, and FIG. 4 specifically, the counter-rotating roller assembly 52 comprises aligning rollers 68, 70, each having a longitudinal axis about which each respective roller rotates. The aligning roller 68, 70 rotate in opposite directions and such that any object contacting an upper surface of either of the rollers is laterally translated in a direction away from the roller assembly 52. Each aligning roller 68, 70 has a roller shaft 72, 74, respectively, which is rotatably mounted to the roller platform 60 of the frame 59 through bearings 76 disposed at opposite ends of each of the aligning rollers 68, 70. Each of the roller shafts 72, 74 has a spur gear 78, 80, respectively. The spur gear 78, 80 are mounted to the roller shafts 72, 74 so that the teeth of the spur gears 78, 80 mesh, resulting in the rotation of one roller and a counter-rotation of the other roller. One of the shafts 72, 74 mounts a pulley 82. The pulley 82 is shown mounted to the roller shaft 72 of the aligning roller 68 but could as easily be mounted to shaft 72 of roller 70.

Figure 5:
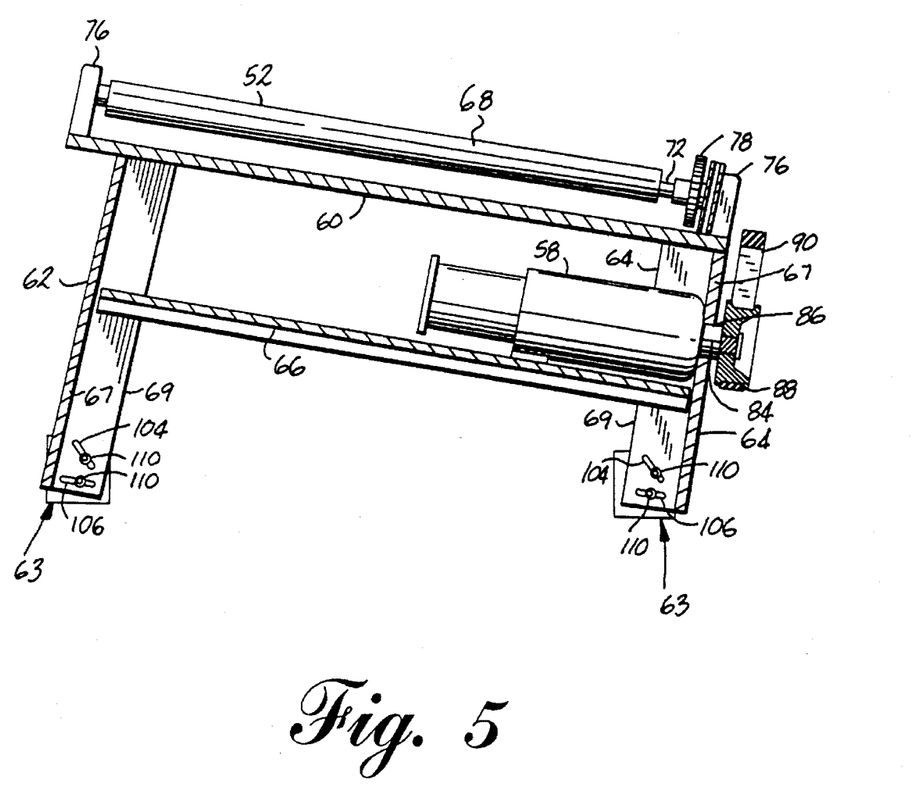
FIG. 5 is a sectional view along lines 5—5 of FIG. 3.

Referring to FIGS. 2, 3 and 5, the electric motor 58 is shown mounted to the drive means platform 66 and drives a shaft 84 which extends through an aperture 86 in the web 67 of frame leg 64 (FIG. 5). The shaft 84 mounts a pulley 88, which is complementary to pulley 82, and which is connected to pulley 82 through a belt 90. In this manner, the electric motor, in cooperation with the belt 90, pulley 82 and 88 and spur gears 78 and 80, drives the counter-rotating aligning rollers 68 and 70. As the motor 58 turns pulley 88 in the counter-clockwise direction (as viewed in FIG. 3), the roller 68 rotates in the counter-clockwise direction and the roller 70 rotates in the clockwise direction.

Figure 6:
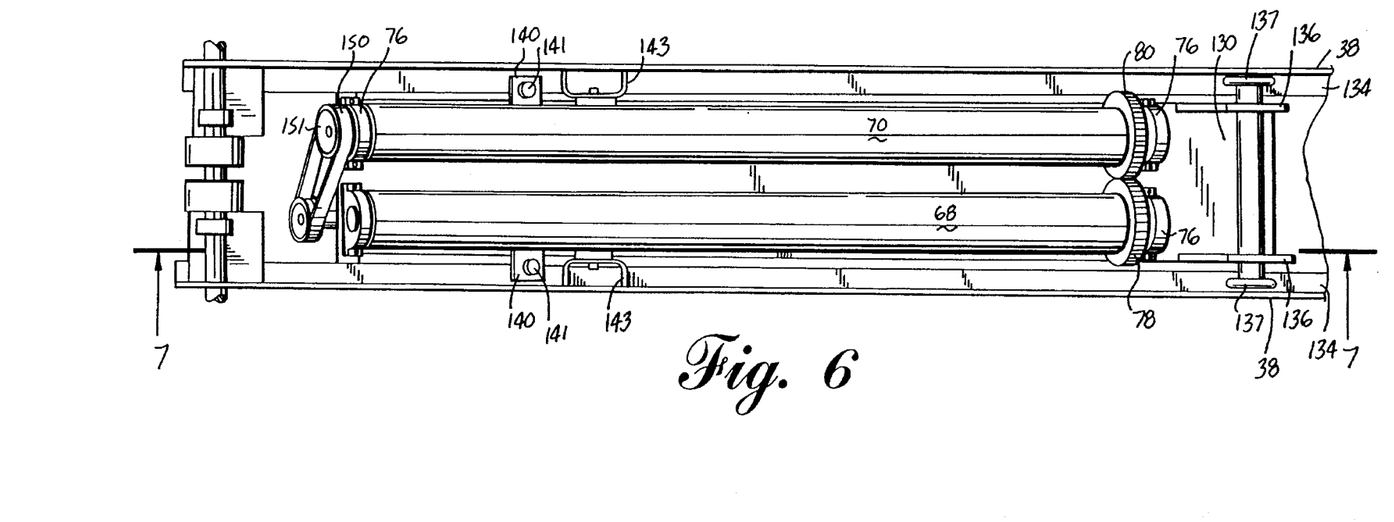
FIG. 6 is a cutaway plan view of an alternative embodiment of the roller assembly of FIG. 1.
Figure 7:
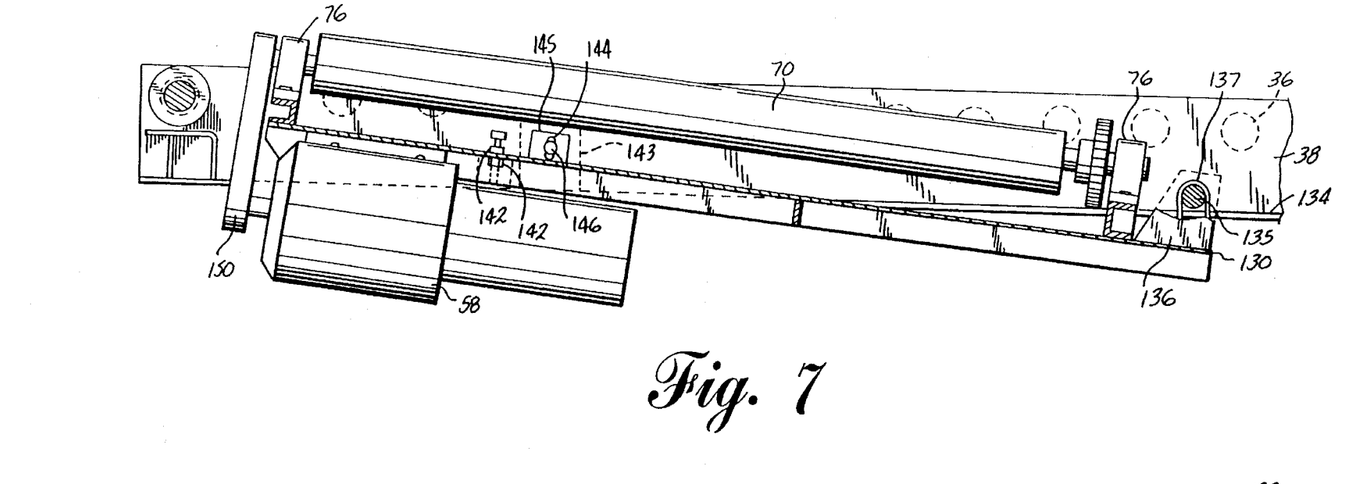
FIG. 7 is a sectional view along line 7—7 of FIG. 6.

FIGS. 6 and 7 show an alternate embodiment of the roller assembly 16. In this embodiment, as in the embodiment shown in FIGS. 2, 3 and 5, the rollers 68 and 70 are mounted by bearings 76 to an aligner platform 130. In FIGS. 6 and 7, the aligner platform 130 is mounted to the secondary side walls 38 defining the opening 40 in the roller conveyor assembly 10. In this embodiment, the secondary side walls 38 are each provided with an angled section 134 and the platform 130 is provided with upstanding support brackets 136 on a lower end of the platform 130. A support rod 135 extends through the brackets and beyond the sides of the platform 130 and rests on the angled sections 134 of the secondary walls 38. U-clamps 137 pivotally mount the support rod 135 to the angled sections 134 of secondary walls 38. An upper end of the platform 130 is provided with tabs 140. Adjustment bolts 141 extending through the tabs and engaging the respective surfaces of the angled sections 134, may be turned to raise and lower the upper end of the platform with respect to the plane of the conveyor assembly 10. The adjustment bolts 141 may be provided with locking nuts 142 in a standard fashion. The secondary walls 38 are further provided with support brackets 143 having elongated openings 144. The platform 130 is provided with upstanding brackets 145 having locking bolts 146 extending therefrom into the elongated openings 144 of the respective support brackets 143 on the secondary walls 38.

In the embodiment of FIGS. 6 and 7, as in the embodiment shown in FIGS. 2, 3 and 5, the aligning rollers 68 and 70 are provided with meshing spur gears 78 and 80 at one end. In the configuration of FIGS. 6 and 7, the motor 58 is attached to the frame 130 by means of standard support brackets (not shown in the drawing) near the upper end of the platform 130. A drive belt 150 drives one of the rollers at one end by means of a belt 150 and a drive pulley 151. The spur gears 78, 80 are at the opposite end from the drive pulley 151. The spur gears 78, 80 may also be at the upper end adjacent the drive pulley 151. A particular advantage of the support arrangement of FIGS. 6 and 7 is that the aligner platform 130 together with the rollers 68 and 70 and the motor 58 extend below the lower surface of the secondary walls 38 by a relatively small distance. This is particularly advantageous in areas where the height requirement of the conveyor system is a constraint.

Figure 8:
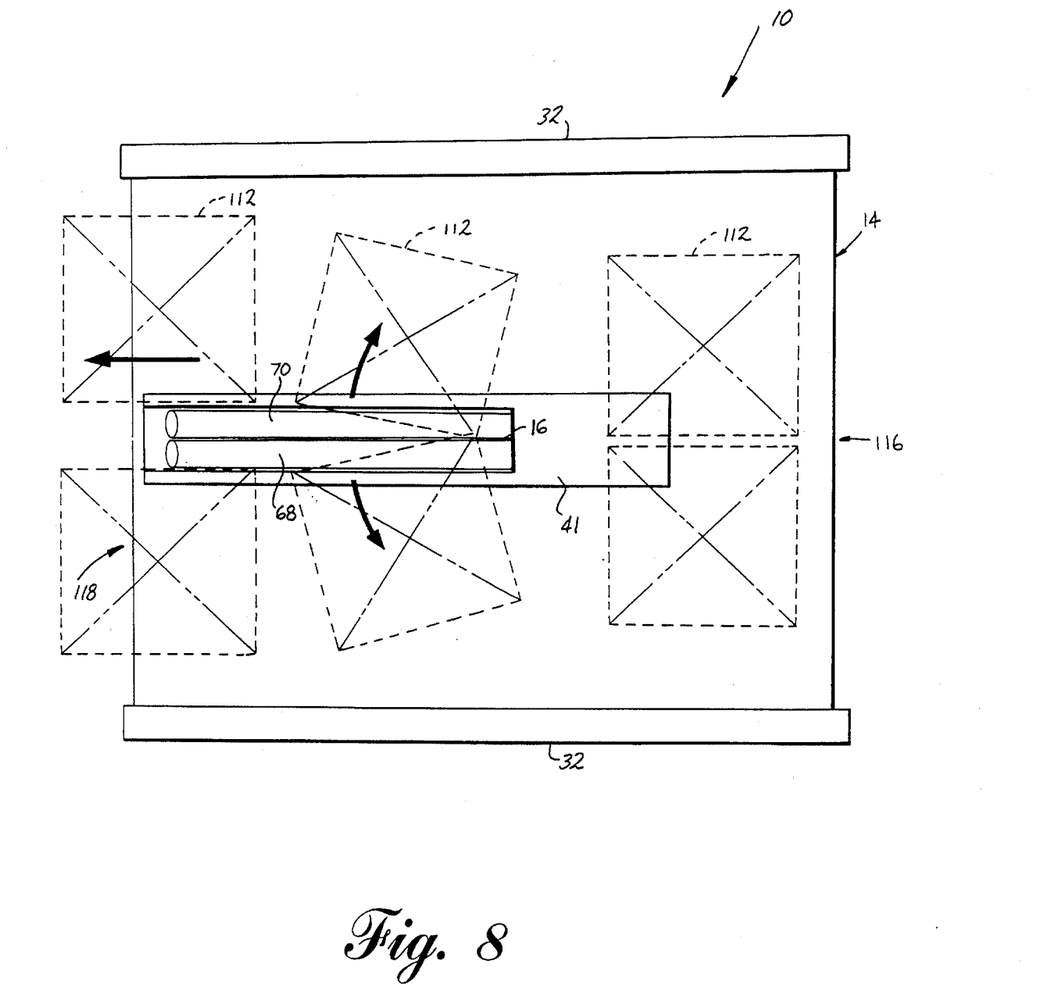
FIG. 8 is a schematic view of the roller conveyor of FIG. 1 showing the movement of articles placed on; roller conveyor.

FIG. 8 is a diagrammatic representation of the conveyor assembly 10 showing pallets 112 being separated and aligned by an aligner/separator according to the invention. A pair of pallets 112, initially immediately adjacent each other, are moved from the entrance end 116 toward the exit end 118. As the pallets approach the aligner/separator 16 a portion of each of the pallets will be contacted by one of the aligning rollers 68, 70 and will be translated laterally to a position immediately adjacent the aligning rollers. As the pallets continue to move in the direction of the exit end, each portion of a pallet contacting one of the rollers will be laterally translated to the same position adjacent the roller such that when the pallet has passed the area where the aligning roller extends above the conveyor plane, each of the pallets will have one side in alignment with a line parallel to one of the rollers.

Figure 9:
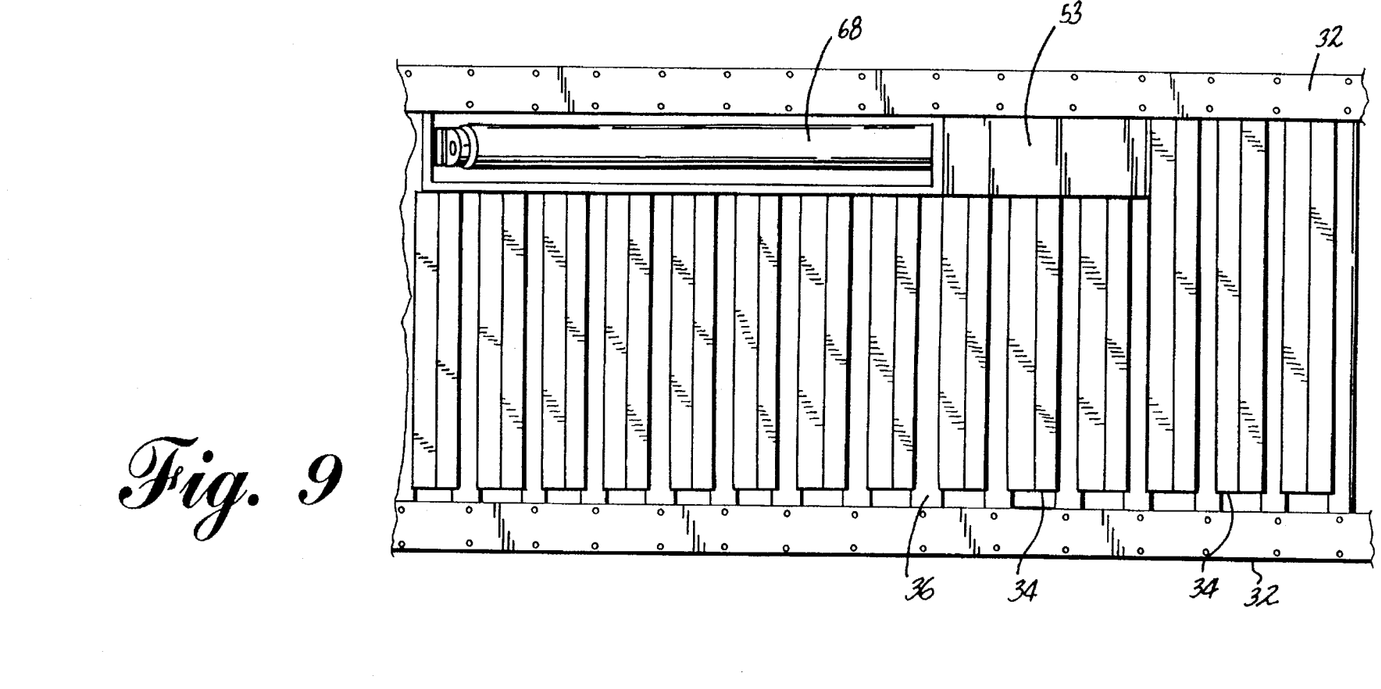
FIG. 9 is a plan view of a roller conveyor showing a single aligning roller mounted along one side of the conveyor frame.

It will be apparent that the pair of counter-rotating rollers 68, 70 function to separate a pair of adjacently disposed pallets. The pallets are likely to be separated even if they have become attached at the sides since the bottom leading edge portion of each of the two pallets is lifted, to cause separation, as the pallets are moved onto the counter-rotating rollers by the normal driving force of the conveyor 14. While in the arrangement disclosed in this application two rollers are used side-by-side to perform the function of separating and aligning, it will be apparent that single roller such as roller 68 driven by the electric motor 58 will serve as an aligner when positioned near one side of a conveyor (FIG. 9). In that case, roller 68 will serve to align one side of a pallet, or other unit being moved on the conveyor, along a line parallel and adjacent to the roller. Two independently operating aligning rollers, such as roller 68 may be disposed near opposed outer side walls of a conveyor and serve to move the units toward a center portion of the conveyor. Such arrangements are clearly within the scope of the invention as disclosed and claimed herein.

In a further application, a single roller such as roller 68 may be used as a sorting/selecting device. Such a roller may be driven by a reversible motor which is activated in response to a barcode reader or the like that determines whether a unit being moved toward the roller is to be moved to a path on one side or on the other side of the roller and transmits a corresponding electrical signal to a reversible motor driving the aligning roller. The reversible motor causes rotation of the aligning roller in the direction of the path in which the unit is to be moved, causing a lateral translation and alignment of the unit in that direction. Such an arrangement is clearly within the scope of the invention as taught and claimed in this application.

Other variations and modification may be devised by those skilled in the art without departing from the spirit and scope of the invention.

The embodiments of the invention in which an exclusive property or privilege is claimed are defined as follows:

1. A roller conveyor with an alignment mechanism, the roller conveyor comprising:

a conveyor frame having a pair of exterior side walls and having an entrance end and an exit end;

a plurality of conveyor rollers, each having a longitudinal axis and mounted to at least one of the exterior side walls at an upper portion of the frame, the conveyor rollers defining a conveyor plane for conveying articles along a path between the entrance end and the exit end;

an opening in the conveyor plane defined by at least one interior secondary side wall spaced from the exterior side walls;

at least some of the conveyor rollers mounted between the at least one interior side wall and the at least one exterior side wall;

at least one aligning roller having a longitudinal axis and mounted in the opening in the conveyor plane, the aligning roller positioned so that the longitudinal axis thereof is substantially perpendicular to the longitudinal axes of the conveyor rollers and is disposed at an acute angle to the conveyor plane, and at least a portion of the aligning roller extends above the conveyor plane;

a drive motor for rotating the aligning roller in a direction toward the at least one exterior side wall;

whereby any part of an article driven onto the at least one aligning roller is translated laterally toward the at least one exterior side wall and thereby aligning the article in a predetermined orientation with respect to the conveyor rollers.

2. A roller conveyor according to claim 1 wherein two aligning rollers are mounted side by side in the opening, each spaced from a respective exterior side wall, and the drive motor drives the two aligning rollers in opposite directions.

3. A roller conveyor according to claim 2 wherein the aligning rollers are oriented at an acute angle with respect to the roller plane toward the exit end.

4. A roller conveyor according to claim 3 wherein the rollers are mounted to an aligner frame comprising opposed legs of different lengths so that the aligner rollers are disposed at an acute angle with respect to the conveyor roller plane.

5. A roller conveyor according to claim 4 wherein the aligner frame further comprises adjustable feet mounted to the opposed legs for adjusting the angle of the aligning rollers with respect to the conveyor plane.

6. A roller conveyor according to claim 5 wherein the feet have first adjustment slots and the legs on the aligner frame have second adjustment slots corresponding to the first adjustment slots and fasteners extending through the first and second adjustment slots to connect the feet to the legs in an adjusted position.

7. A roller conveyor according to claim 1 wherein the aligner frame has an adjustment mechanism to vary the acute angle of the at least one aligning roller with respect to the conveyor roller plane.

8. A roller conveyor according to claim 1 wherein the acute angle of the at least one alignment roller is between two and ten degrees.

9. A roller conveyor according to claim 1 wherein the aligner frame further comprises adjustable supports for adjusting the angle of the longitudinal axis of the at least one aligning roller with respect to the conveyor plane.

10. A roller conveyor according to claim 9 wherein the adjustable supports comprise feet with first adjustment slots and legs on the frame having second adjustment slots corresponding to the first adjustment slots and fasteners extending through the first and second adjustment slots to connect the feet to the legs in an adjusted position.

11. A roller conveyor according to claim 1 and comprising two aligning rollers disposed at an acute angle with respect to the conveyor plane in the direction of the exit end.

12. A conveyor with an alignment mechanism, the conveyor comprising:

a conveyor frame mounting a conveyor defining a conveyor plane for conveying articles along the conveyor plane from an entrance end to an exit end thereof;

an opening in the conveyor plane;

at least one aligning roller mounted to the conveyor frame in the opening in the conveyor plane, the aligning roller having a longitudinal axis and mounted to the conveyor frame in a position so that the longitudinal axis thereof is disposed at an acute angle to the conveyor plane, and at least a portion of the aligning roller extends above the conveyor plane; and a drive motor for rotating the aligning roller;

whereby articles which are driven onto the at least one aligning roller are rotationally translated laterally away from the at least one aligning roller and thereby aligned in a predetermined orientation with respect to the conveyor frame.

13. The conveyor in accordance with claim 12, wherein the at least one aligning roller is mounted along one side of the conveyor frame.

14. The conveyor in accordance with claim 12 and further comprising an additional aligning roller mounted to the conveyor frame in a side-by-side relationship with the at least one aligning roller and wherein the side-by-side aligning rollers are rotated in opposite directions.

15. The conveyor in accordance with claim 14 and further comprising a plurality of conveyor rollers on opposite sides of the side-by-side aligning rollers, each of the conveyor rollers having a longitudinal axis extending substantially perpendicularly to the longitudinal axis of the at least one aligning roller, whereby articles disposed in a side-by-side relationship and driven onto the side-by-side aligning rollers are separated by the aligning rollers and moved onto the conveyor rollers on opposite sides of the side-by-side aligning rollers.

16. The conveyor in accordance with claim 12 wherein the at least one roller is mounted to an aligner frame adjustably mounted to the conveyor frame, the aligner frame comprising a lower end movably mounted to the conveyor frame and an upper end adjustably supported on the conveyor frame to allow for selective raising and lowering of the upper end of the aligner frame relative to the lower end of the aligner frame, whereby the angle acute angle may be adjusted.

17. The conveyor in accordance with claim 16 wherein the conveyor frame comprises a horizontally extending angle frame member and the aligner frame comprises an adjustment screw engaging the angle frame member for raising and lowering the upper end of the aligner frame relative to the conveyor frame.

18. The conveyor in accordance with claim 17 wherein the aligner frame comprises a pair of opposed mounting brackets extending upwardly from the lower end and a support member mounted to the mounting brackets and to the angle frame member.

19. The conveyor in accordance with claim 18 wherein the conveyor frame further comprises first and second support brackets provided with vertically extending elongated openings and the aligner frame further comprises locking bolts extending into the elongated openings.

20. A method of conveying articles in a predetermined orientation comprising the steps of:

placing the articles in a random orientation on an entrance end of a roller conveyor;

moving the articles from the entrance end to an exit end of the roller conveyor;

driving at least some of the articles on a ramped roller between the entrance end and exit end of the roller conveyor; and rotating the ramped roller toward a side of the conveyor to thereby rotate the article into a predetermined orientation with respect to the conveyor side.

21. The method of claim 20 wherein the ramped roller is spaced laterally from the conveyor side a distance at least equal to the width of the article in the predetermined orientation.

* * * * *